United States Patent Office 3,444,188
Patented May 13, 1969

3,444,188
7-FLUORO-B-HOMO STEROIDS AND THEIR
PREPARATION
Lawrence H. Knox, deceased, late of Mexico City, Mexico,
 by Anne A. Knox, legal representative, Mexico City,
 Mexico, assignor to Syntex Corporation, Panama,
 Panama, a corporation of Panama
No Drawing. Filed Mar. 29, 1966, Ser. No. 538,433
Claims priority, application Mexico, Mar. 31, 1965,
81,826, 81,827
Int. Cl. C07c *171/02, 167/04*
U.S. Cl. 260—488                                    16 Claims

ABSTRACT OF THE DISCLOSURE 7-fluoro-B-homo-19-nor steroids of androstane and pregnane series prepared by the reaction of a 3β-acyloxy-19-hydroxy-Δ⁵ steroid with an α-fluorinated amine having useful therapeutic activity.

---

The present invention relates to novel steroid derivatives and to processes for their preparation. More particularly, this invention relates to 7-fluoro-B-homo-19-norsteroid derivatives and to processes for the preparation from 19-hydroxy-Δ⁵-steroids.

The compounds of the present invention may be represented by the following formula:

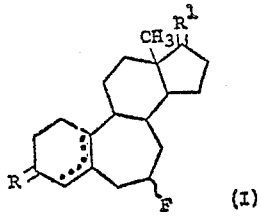

wherein R is an oxygen atom or the group

in which $R^5$ is hydrogen, tetrahydropyranyl, or a hydrocarbon carboxylic acyl group of less than 12 carbon atoms; $R^1$ is an oxygen atom or the groups

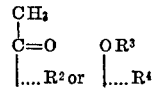

in which $R^2$ is hydrogen, hydroxy or acyloxy; $R^3$ is hydrogen, tetrahydropyranyl or acyl, and $R^4$ is hydrogen, lower alkyl such as methyl, ethyl and the like, lower alkenyl such as vinyl, prop-1-enyl and the like, or lower alkynyl such as ethynyl; and the dotted line between C–4, C–5 and C–10 in ring A indicates a double bond between C–4 and C–5 or between C–5 and C–10.

In the above formula and in the present specification and claims, a wavy line $\}$ represents both the α and β configurations, collectively or singularly, and both such configurations are included within the scope of the present invention.

The hydrocarbon carboxylic acyl and acyloxy groups of the compounds of the present invention will contain less than 12 carbon atoms and may be of a straight, branched, cyclic or cyclic-aliphatic chain structure. This structure may be saturated, unsaturated, or aromatic and optionally substituted by functional groups such as hydroxy, alkoxy containing up to 5 carbon atoms, acyloxy containing up to 12 carbon atoms, nitro, amino, halogeno, and the like. Typical esters thus include acetate, propionate, enanthate, benzoate, trimethylacetate, t-butylacetate, phenoxyacetate, cyclopentylpropionate, aminoacetate, β-chloropropionate, adamantoate, and the like.

Those compounds having the 2-carbon pregnane side chain in the 17β-position and those having a 17α-alkynyl substituent demonstrate progestational activity and are useful in the control of fertility and in the treatment of various menstrual disorders. Those compounds of the present invention having a divalent oxygen atom in the 17-position and those having a 17β-hydroxy group with or without alkyl or alkenyl substitution in the 17α-position are anabolic agents useful in the treatment of debilitory conditions such as old age, postoperative recuperation, and the like. The compounds of the present invention also exhibit anti-androgen properties and are thus valuable in the treatment of acne, benign prostate hypertrophy and hirsutism in females.

The compounds of the present invention may be prepared via utilization of the following reaction:

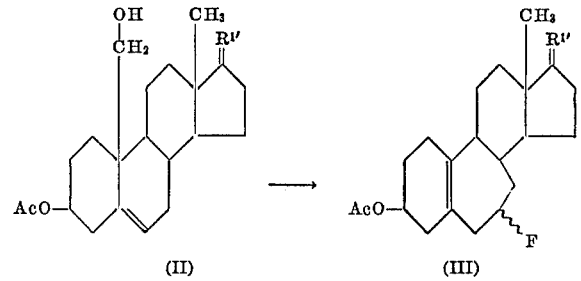

In the foregoing Ac is acyl and $R^{1\prime}$ is an oxygen atom or the group

in which $R^{2\prime}$ is hydrogen or acyloxy.

In accordance with the present invention, a 3β-acyloxy-19-hydroxy-Δ⁵-steroid (II) is treated with an α-fluorinated amine of the formula

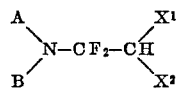

in which $X^1$ is fluoro or chloro; $X^2$ is fluoro, chloro or trifluoromethyl; each of A and B are alkyl of 1 to 6 carbon atoms or, taken together, alkylene of from 5 to 7 atoms inclusively. Typical of such reactants are 1-diethylamino-1,1,2-trifluoro-2-chloroethane, 1-dimethylamino-1,1,2,2-tetrafluoroethane, 1-dipropylamino-1,1,2-trifluoro-2-chloroethane, 1-diethylamino-1,1-difluoro-2,2-dichloroethane, and the like. The reaction is generally conducted at reduced temperatures below 0° C., as for example approximately —20° C., in the presence of an inert, nonpolar, organic solvent such as methylene chloride, dihydrofuran, acetonitrile, and the like, preferably methylene chloride.

Upon such treatment with a slight excess, e.g. 1.5 molar equivalents, of the above α-fluorinated amine for a period of time of from about 15 to about 60 hours, preferably about 48 hours, there is obtained a mixture of the 7α-fluoro- and 7β-fluoro-3β-acyloxy-B-homo-19-norpregn-5(10)-ene or -estr-5(10)-ene derivatives of Formula III with the 7β-isomer predominating. These two components may be separated via conventional techniques, such as chromatography, or the mixture may be further processed with separation being effected at a later stage of the reaction sequence if desired.

In the case of the 7-fluoro-B-homo-19-norpregn-5(10)-enes, conventional saponification, as with potassium bicarbonate or potassium hydroxide in methanol, then yields the corresponding 3β-hydroxy derivatives (IV), which may be oxidized as with chromic acid to yield the 7-fluoro-B-homo-19-norpregn-5(10)-ene-3,20-diones of Formula V. Treatment of these compounds with a dilute solution of oxalic acid in alcohol at reflux temperatures for approximately 16 hours, or with sodium methoxide at reflux temperatures for about one hour, yields the corresponding 3-keto-Δ⁴ derivatives of Formula VI. Alternatively, these 3-keto-Δ⁴ derivatives may be obtained via direct oxidation of the corresponding 3β-hydroxy-Δ⁵⁽¹⁰⁾ intermediates under standard Oppenauer conditions. The 17α-acyloxy group, when present in these B-homo-19-norpregnene derivatives, may be hydrolyzed via conventional techniques, as with refluxing methanolic potassium bicarbonate, and the resulting 17α-hydroxy compound may in turn be reacylated, if desired, with a carboxylic acid anhydride in the presence of an acid catalyst such as p-toluenesulfonic acid. These latter reactions may be represented as follows:

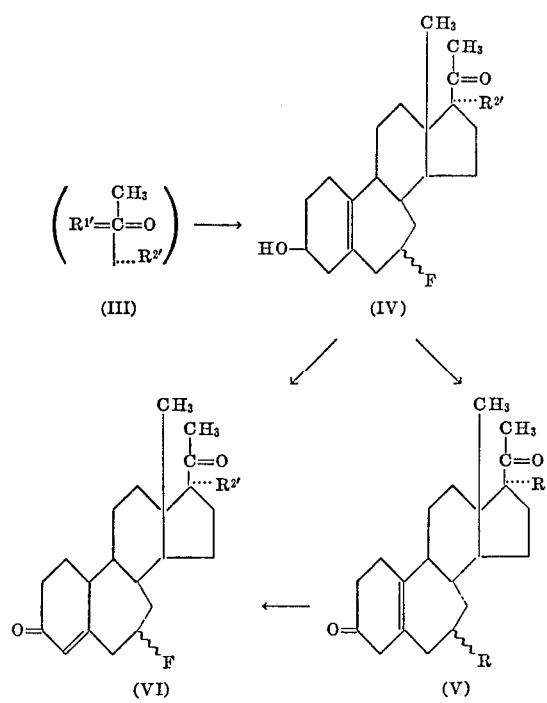

In the case of the 7-fluoro-B-homo-estr-5(10)-enes of Formula III, the 17-keto derivatives may be subjected to the analogous synthetic routes described above to yield the 7-fluoro-B-homo-estr-4-ene-3,17-dione, or alternatively may be treated with a lower alkyl, lower alkenyl or lower alkynyl magnesium halide, or with an alkyl lithium salt, or with an alkenyl sodium or potassium salt to yield the corresponding 3β-acyloxy-7-fluoro-B-homo-estr-5(10)-en-17β-ol substituted in the 17α-position by a lower alkyl, lower alkenyl or lower alkynyl group. Such 17α-lower alkynyl derivatives may in turn be converted to the corresponding 17α-lower alkenyl or 17α-lower alkyl derivative via conventional controlled catalytic hydrogenation. These derivatives may then be hydrolyzed and oxidized as previously described to yield the corresponding 3-keto-7-fluoro-B-homo-estr-4-en-17β-ol substituted in the 17α-position by a lower alkyl, lower alkenyl or lower alkynyl group. The tertiary 17β-hydroxy group may be acylated via conventional techniques, as for example with acetic anhydride and p-toluenesulfonic acid in benzene.

In the case of the 3-keto-7-fluoro-B-homo-estr-4-en-17β-ol bearing only a hydrogen atom in the 17α-position, the corresponding 3,17-dione is first reduced with a metal hydride such as lithium aluminum hydride, and the resulting 3,17-diol is then back-oxidized as with 2,3-dichloro-5,6-dicyanobenzoquinone to yield the desired 3-keto-17β-hydroxy compound. This 17β-hydroxy derivative may be acylated via conventional techniques, as for example with acetic anhydride in pyridine, to yield the corresponding 17β-acylates.

The 3-keto compounds of the present invention may also be back-reduced, as with sodium borohydride in isopropanol, to yield the 3β-hydroxy derivatives. These and other 3β-hydroxy compounds may be esterified in the manner previously described or etherified with dihydropyran and an acid catalyst such as p-toluenesulfonyl chloride or p-toluenesulfuric acid.

The following examples will serve to further typify the nature of this invention, but as these are presented solely for the purpose of illustration, they should not be construed as a limitation thereof.

EXAMPLE 1

A solution of 22.4 g. of 3β-acetoxy-20-ketopregn-5-en-19-ol in 200 ml. of anhydrous methylene chloride and 17 g. of 1-diethylamino-1,1,2-trifluoro-2-chloroethane is allowed to stand at −20° C. for 48 hours, and the total reaction product is then filtered through 1.2 kg. of alumina, eluting the column with hexane, to yield 3β-acetoxy-7-fluoro-B-homo-19-norpregn-5(10)-en-20-one, M.P. 85°–86° C., which may be recrystallized from acetone:hexane.

A solution of 5 g. of 3β-acetoxy-7-fluoro-B-homo-19-norpregn-5(10)-en-20-one in 125 ml. of a 5% methanol solution of potassium hydroxide is allowed to stand at room temperature overnight and is then diluted with water. The solid is collected by filtration, washed with water, and dried in vacuo to yield 3β-hydroxy-7-fluoro-B-homo-19-norpregn-5(10)-en-20-one, M.P. 71°–73° C., which may be recrystallized from methanol.

A solution of 2 g. of 3β-hydroxy-7-fluoro-B-homo-19-norpregn-5(10)-en-20-one in 50 ml. of acetone is cooled to 0° C. and treated, under an atmosphere of nitrogen and with stirring, with a solution of 8 N chromic acid (prepared by mixing 26 g. of chromium trioxide with 23 ml. of concentrated sulfuric acid and diluting with water to 100 ml.) until the color of the reagent persists in the mixture. It is stirred for five minutes longer at 0°–5° C. and diluted with water. The mixture is extracted with ether, and these extracts are washed with 5% sodium bicarbonate solution and water to neutrality, dried over anhydrous sodium sulfate and evaporated to dryness to yield 7-fluoro-B-homo-19-norpregn-5(10)-ene-3,20-dione, M.P. 103°–104° C., which may be recrystallized from methanol.

A solution of 520 mg. of 7-fluoro-B-homo-19-norpregn-5(10)-ene-3,20-dione in 25 ml. of 96% ethanol is treated with 520 mg. of oxalic acid. The mixture is refluxed for 16 hours and then diluted with water and extracted with ethyl acetate. The organic extracts are washed with sodium bicarbonate solution and water to neutrality, dried over anhydrous sodium sulfate and evaporated to dryness under reduced pressure to yield 7-fluoro-B-homo-19-norpregn-4-ene-3,20-dione, M.P. 157°–158° C., which is recrystallized from acetone:hexane.

EXAMPLE 2

In accordance with the process described in Example 1, 3β,17α-diacetoxy-19-hydroxypregn - 5 - ene-3,20-dione is converted successively to 3β,17α-diacetoxy-7-fluoro-B-homo-19-norpregn-5(10)-en-20-one; 3β-hydroxy-7-fluoro-17α-acetoxy-B-homo-19-norpregn-5(10) - en - 20-one; 7-fluoro-17α-acetoxy-B-homo-19-norpregn-5(10)-ene - 3,20-dione; and 7-fluoro-17α-acetoxy-B-homo-19-norpregn-4-ene-3,20-dione.

EXAMPLE 3

To a solution of sodium methoxide, prepared by dissolving 200 mg. of sodium in 50 ml. of anhydrous methanol, there is added 1 g. of 7-fluoro-B-homo-19-norpregn - 5(10) - ene - 3,20-dione. The resulting mixture is heated at reflux for one hour, cooled, diluted with water and extracted with ethyl acetate. These extracts are washed with water to neutrality, dried over anhydrous sodium sulfate and evaporated to dryness. Crystallization from acetone:hexane affords 7 - fluoro - B - homo-19-norpregn-4-ene-3,20-dione, which is identical to that obtained in Example 1.

In a like manner, 7-fluoro-17α-acetoxy-B-homo-19-norpregn-5(10)-ene-3,20-dione is converted to 7-fluoro-17α-acetoxy-B-homo-19-norpregn-4-ene-3,20-dione.

EXAMPLE 4

A solution of 1 g. of 7-fluoro-17α-acetoxy-B-homo-19-norpregn-4-ene-3,20-dione in 50 ml. of methanol is heated at reflux temperatures for three hours with 250 mg. of potassium hydroxide dissolved in 1 ml. of water. The mixture is then poured into ice water and the solid is collected by filtration, washed with water to neutrality and dried to yield 7-fluoro-17α-hydroxy-B-homo-19-norpregn-4-ene-3,20-dione, which is further purified by recrystallization from acetone:hexane.

EXAMPLE 5

A solution of 1 g. of 3β-hydroxy-7-fluoro-17α-acetoxy-B-homo-19-norpregn-5(10)-en-20-one in 80 ml. of toluene and 20 ml. of cyclohexanone is dried by distilling 10 ml. of the solvent. A solution of 1 g. of aluminum isopropoxide dissolved in 7 ml. of anhydrous toluene is then added and the mixture is refluxed for 45 minutes. Four milliliters of acetic acid are then added and the solvents are removed by steam distillation. The residue is extracted several times with ethyl acetate and these extracts are washed with 5% hydrochloric acid solution, water, 10% sodium carbonate solution and water to neutrality, dried over anhydrous sodium sulfate and evaporated to dryness to yield 7-fluoro-17α-acetoxy-B-homo-19-norpregn-4-ene-3,20-dione.

7 - fluoro-B-homo-19-norpregn-4-ene-3,20-dione is prepared in a similar fashion.

EXAMPLE 6

Two milliliters of dihydropyran are added to a solution of 1 g. of 3β - hydroxy - 7 - fluoro - B-homo-19-norpregn-5(10)-en-20-one in 15 ml. of benzene. About 1 ml. is removed by distillation to remove moisture and 0.4 g. of p-toluenesulfonic acid is added to the cooled solution. This mixture is allowed to stand at room temperature for four days and is then washed with aqueous sodium carbonate solution and water, dried and evaporated. The residue is chromatographed on neutral alumina, eluting with hexane, to yield 3β-tetrahydropyranyloxy-7-fluoro-B-homo-10-norpregn-5(10)-en-20-one, which is recrsytallized from pentane.

3β-tetrahydropyranyloxy-7-fluoro-17α-acetoxy-B-homo-19-norpregn-5(10)-en-20-one is obtained in a similar fashion.

EXAMPLE 7

To a solution of 5 g. of 7-fluoro-17α-hydroxy-B-homo-19-norpregn-4-ene-3,20-dione in 100 ml. of anhydrous benzene are added 1 g. of p-toluenesulfonic acid and 10 ml. of propionic anhydride. The mixture is allowed to stand for 24 hours at room temperature and is poured with stirring into ice and water. The organic phase is separated, washed with 10% sodium carbonate solution and with water, dried and evaporated to yield 7-fluoro-17α - propionolyoxy - B - homo - 19-norpregn-4-ene-3,20-dione, which is further purified through recrystallization from ether:hexane.

By utilizing other anhydrides in the foregoing procedure, such as caproic anhydride, the corresponding 17α-acylates are obtained, e.g. 7-fluoro-17α-caproyloxy-B-homo-19-norpregn-4-ene-3,20-dione.

EXAMPLE 8

A solution of 200 mg. of 7 - fluoro - 17α - acetoxy - B-homo-19-norpregn-4-ene-3,20-dione in 32 ml. of anhydrous isopropanol and 25 mg. of sodium borohydride is stirred at room temperature for 15 hours. One hundred ml. of water is added and the resulting suspension is extracted several times with ether. The ether phase is dried over sodium sulfate and evaporated to dryness under reduced pressure to yield 3β - hydroxy - 7 - fluoro - 17α-acetoxy-B-homo-19-norpregn-4-en-20-one, which may be further purified by recrystallization from ether.

Two milliliters of dihydropyran are added to a solution of 1 g. of 3β-hydroxy-7-fluoro-17α-acetoxy-B-homo-19-norpregn-4-en-20-one in 15 ml. of benzene. About 1 ml. is removed by distillation to remove moisture and 0.4 g. of p-toluenesulfonic acid is added to the cooled solution. This mixture is allowed to stand at room temperature for four days and is then washed with an aqueous sodium carbonate solution and water, dried and evaporated. The residue is chromatographed on neutral alumina, eluting with hexane, to yield 3β-tetrahydropyranyloxy-7-fluoro-17α - acetoxy - B-homo-19-norpregn-4-en-20-one, which is recrystallized from pentane.

EXAMPLE 9

A mixture of 10.4 g. of 3β-acetoxy-19-hydroxyandrost-5-en-17-one and 9.12 g. of 1-diethylamino-1,1,2-trifluoro-2-chloroethane in 200 ml. of anhydrous methylene chloride is allowed to stand at 0° C. for 42 hours. After removal of the solvents through vacuum distillation, the residue is chromatographed on Florisil absorbent, eluting with hexane:ether at successive ratios of 9:1, 4:1 and 1:1 to yield 3β - acetoxy - 7-fluoro-B-homo-estr-5(10)-en-17-one, M.P. 109°–110° C.

In this procedure 1 - dipropylamino - 1,1,2 - trifluoro-2-chloroethane may alternatively be used as the nonsteroidal reactant with identical results. The reaction time may be reduced to 15–17 hours with similar results being obtained. Reduction of the temperature to —20° C. increases the relative yield of this product.

EXAMPLE 10

A mixture of 1.5 g. of 3β-acetoxy-7-fluoro-B-homo-estr-5(10)-en-17-one and 100 ml. of 5% methanolic potassium hydroxide solution is allowed to stand at room temperature (about 25° C.) for about 15 hours. Dilution with water and collection of the thus formed solid yields 3β - hydroxy-7-fluoro-B-homo-estr-5(10)-en-17-one, M.P. 72°–74° C.

To 4.0 g. of this material in 100 ml. of acetone are added with stirring 5 ml. of 8 N chromic acid solution, maintaining a temperature of 0°–5° C. After five minutes, the mixture is diluted with water and extracted with ether. These extracts are washed to neutrality with sodium bicarbonate solution and water, dried over sodium sulfate and evaporated to dryness to yield 7-fluoro-B-homo-estr-5(10)-ene-3,17-dione. This material is dissolved in 100 ml. of ethanol containing 3.5 g. of oxalic acid. The mixture is refluxed for 16 hours, diluted with water and extracted with ethyl acetate. These extracts are washed with aqueous sodium bicarbonate solution and water to neutrality, dried over sodium sulfate and evaporated to dryness to yield 7 - fluoro - B-homo-estr-4-ene-3,17-dione, M.P. 139°–140° C., which is recrystallized from acetone: hexane.

EXAMPLE 11

A solution of 1.8 g. of 7-fluoro-B-homo-estr-4-ene-3,17-dione in 75 ml. of anhydrous tetrahydrofuran and 100 ml. of ether is added in a dropwise fashion with stirring to 1.8 g. of lithium aluminum hydride in 200 ml. of ether. After stirring for 30 minutes, the excess reagent is destroyed by the addition of ethyl acetate and water. After then adding sodium sulfate, the inorganic material is removed by filtration and washed carefully with hot ethyl acetate. Evaporation of the combined organic solution then yields 7-fluoro - B - homo-estr-4-ene-3,17β-diol. This material is dissolved in 23 ml. of dioxane and 2.2 g. of 2,3-dichloro-5,6-dicyanobenzoquinone are added. The reaction mixture is allowed to stand at room temperature for 15 hours and is then filtered through a column of 100 g. of alumina, eluting with methylene chloride. The solution is then evaporated to dryness and the residue is chromatographed on 40 g. of washed alumina, eluting with 3:1 hexane:ether to yield 7-fluoro-B-homo-estr-4-en-17β-ol-3-one, M.P. 134°–135° C., which is recrystallized from acetone:hexane.

EXAMPLE 12

A solution of 5 g. of 3β-hydroxy-7-fluoro-B-homo-estr-5(10)-en-17-one in 250 ml. of thiophene-free benzene is treated with 27.5 ml. of 4 N methylmagnesium bromide in ether. The mixture is refluxed with the exclusion of moisture for three hours, cooled, and cautiously treated with excess aqueous ammonium chloride solution. The mixture is then extracted with ethyl acetate, and these extracts are washed with water, dried over anhydrous sodium sulfate and evaporated to dryness to yield 7-fluoro-17α-methyl - B - homo-estr-5(10)-ene-3β,17β-diol, which may be recrystallized from methylene chloride:hexane.

In a similar fashion, by employing ethyl, propyl, vinyl and prop-1-enylmagnesium bromide there are respectively obtained, 7-fluoro - 17α - ethyl - B - homo-estr-5(10)-ene-3β,17β-diol; 7 - fluoro-17α-propyl-B-homo-estr-5(10)-ene-3β,17β-diol; 7-fluoro - 17α - vinyl-B-homo-estr-5(10)-ene-3β,17β-diol; and 7-fluoro-17α-(prop-1-enyl)-B-homo-estr-5(10)-ene,3β,17β-diol.

EXAMPLE 13

A solution of 1 g. of 3β-acetoxy-7-fluoro-B-homo-estr-5(10)-en-17-one in 30 ml. of anhydrous benzene is added under nitrogen to a solution of 1.4 g. of potassium in 30 ml. of t-amyl alcohol. A slow current of purified acetylene is passed through the solution for 40 hours, and the solution is then diluted with water and extracted with benzene. The organic extracts are washed to neutrality, dried over anhydrous sodium sulfate and evaporated to dryness. Chromatography of the residue on 70 g. of alkaline alumina, eluting with 2:3 hexane:benzene, yields 7-fluoro-17α - ethynyl - B - homo-estr-5(10)-ene-3β,17β-diol. This compound, upon oxidation with chromic acid as described in Example 10, yields 7-fluoro-17α-ethynyl-B-homo-estr-5(10)-en-17β-ol-3-one which when treated with oxalic acid, also as described in Example 10, yields 7-fluoro-17α-ethynyl-B-homo-estr-4-en-17β-ol-3-one.

In an analogous fashion, the following compounds are obtained as well as their corresponding $\Delta^{5(10)}$ intermediates: 7-fluoro-17α-methyl-B-homo-estr-4-en-17β-ol-3-one; 7 - fluoro-17α-ethyl-B-homo-estr-4-en-17β-ol-3-one; 7-fluoro-17α-propyl-B-homo-estr-4-en-17β-ol-3-one; 7 - fluoro-17α-vinyl - B - homo-estr-4-en-17β-ol-3-one; 7-fluoro-17α-(prop-1-enyl)-B-homo-estr-4-en-17β-ol-3-one.

EXAMPLE 14

A mixture of 1 g. of 7-fluoro-B-homo-estr-4-en-17β-ol-3-one, 4 ml. of pyridine and 2 ml. of acetic anhydride is allowed to stand at room temperature for 15 hours. The mixture is then poured into ice water and the solid which forms is collected by filtration, washed with water and dried to yield 17β-acetoxy-7-fluoro-B-homo-estr-4-en-3-one which may be further purified through recrystallization from acetone:hexane.

In a similar manner, but using propionic, caproic, enanthic and cyclopentylpropionic anhydrides as the esterifying agents, the corresponding esters are obtained.

EXAMPLE 15

A mixture of 2 g. of 7-fluoro-B-homo-estr-4-en-17β-ol-3-one in 8 ml. of pyridine and an equimolar amount of benzoyl chloride is heated at steam bath temperatures for 30 minutes. The mixture is then poured into ice water and the solid which forms is collected by filtration, washed with water and dried to yield 17β-benzoyloxy-B-homo-estr-4-en-3-one, which is further purified through recrystallization from methylene chloride:hexane.

EXAMPLE 16

A mixture of 1 g. of 7-fluoro-17α-methyl-B-homo-estr-4-en-17β-ol-3-one, 1 g. of p-toluenesulfonic acid monohydrate, 50 ml. of acetic acid and 25 ml. of acetic anhydride is allowed to stand at room temperature for 24 hours and is then poured into water and stirred. This mixture is then extracted with methylene chloride, and these extracts are dried and evaporated to yield 7-fluoro-17α-methyl-17β-acetoxy-B-homo-estr-4-en-3-one, which is recrystallized from acetone:ether.

By utilizing propionic, caproic, undecenoic and cyclopentylpropionic anhydrides as esterifying agents, there are obtained the propionate, caproate, undecenoate and cyclopentylpropionate of 7-fluoro - 17α - methyl-B-homo-estr-4-en-17β-ol-3-one, respectively.

Other representative esters of the present invention which are prepared via the procedure of this example include:

7-fluoro-17α-ethynyl-17β-acetoxy-B-homo-estr-4-en-3-one;
7-fluoro-17α-propyl-17β-acetoxy-B-homo-estr-4-en-3-one;
7-fluoro-17α-vinyl-17β-acetoxy-B-homo-estr-4-en-3-one;
7-fluoro-17α-(prop-1-enyl)-17β-acetoxy-B-homo-estr-4-en-3-one;
7-fluoro-17α-ethynyl-17β-propionoyloxy-B-homo-estr-4-en-3-one;
7-fluoro-17α-ethynyl-17β-caproyloxy-B-homo-estr-4-en-3-one;
7-fluoro-17α-vinyl-17β-cyclopentylpropionoyloxy-B-homo-estr-4-en-3-one;
7-fluoro-17α-(prop-1-enyl)-17β-enanthoyloxy-B-homo-estr-4-en-3-one; and
7-fluoro-17α-ethyl-17β-acetoxy-B-homo-estr-4-en-3-one.

EXAMPLE 17

A solution of 1 g. of sodium borohydride in 3 ml. of water is added to an ice-cooled solution of 1 g. of 7-fluoro-17α-ethynyl - 17β - acetoxy-B-homo-estr-4-en-3-one in 120 ml. of methanol and the mixture is then allowed to stand for 16 hours at room temperature. The excess reagent is decomposed by the addition of acetic acid and the solution is then concentrated to small volume in vacuo and diluted with water. The product is extracted with ethyl acetate, and these extracts are washed with water, dried and evaporated to yield 3β-hydroxy-7α-fluoro-17α-ethynyl-17β-acetoxy-B-homo-estr-4-ene, which may be further purified by recrystallization from acetone:hexane.

Two milliliters of dihydropyran are added to a solution of 1 g. of 3β-hydroxy-7α-fluoro-17α-ethynyl-17β-acetoxy-B-homo-estr-4-ene in 15 ml. of benzene. About 1 ml. is removed by distillation to remove moisture and 0.4 g. of p-toluenesulfonyl chloride is added to the cooled solution. This mixture is allowed to stand at room temperature for four days and is then washed with aqeous sodium carbonate solution and water, dried and evaporated. The residue is chromatographed on neutral alumina, eluting with hexane, to yield 3β-tetrahydropyranyloxy-7α-fluoro-17α-ethynyl-17β-acetoxy-B-homo - estr - 4-ene, which is recrystallized from pentane.

A solution of 0.17 g. of potassium hydroxide in 0.2 ml. of water and 2.5 ml. of methanol is added over a period of 30 minutes to a refluxing solution of 1 g. of 3β-tetrahydro-pyranyloxy-7α-fluoro-17α-ethynyl-17β-acetoxy - B-homo-estr-4-ene in 30 ml. of methanol under nitrogen. The solution is refluxed for two hours, cooled, neutralized with acetic acid and concentrated under reduced pressure. After the addition of water, the solid which forms is collected by filtration and is dried to yield 3β-tetrahydropyranyloxy-7α-fluoro-17α-ethylnyl-B-homo - estr - 4- en-17β-ol, which is recrystallized from acetone:hexane.

EXAMPLE 18

By subjecting 7-fluoro-17α-ethynyl-B-homo-estr-4-en-17β-ol-3-one to the initial procedure of Example 17, there is obtained 7-fluoro-17α-ethynyl-B-homo-estr-4-ene-3β,17β-diol. Treatment of this compound with acetic anhydride and pyridine in an analogous fashion to that described in Example 14 yields 3β-acetoxy-7-fluoro-17α-ethynyl-B-homo-estr-4-en-17β-ol.

EXAMPLE 19

Two milliliters of dihydropyran are added to a solution of 1 g. of 7-fluoro-17α-ethynyl-B-homo-estr-4-en-17α-ol-3-one in 15 ml. of benzene. About 1 ml. is removed by distillation to remove moisture and 0.4 g. of p-toluenesulfonic acid is added to the cooled solution. This mixture is allowed to stand at room temperature for four days and is then washed with an aqueous sodium carbonate solution and water, dried and evaporated. The residue is chromatographed on neutral alumina, eluting with hexane, to yield 7-fluoro-17α-ethynyl-17β-tetrahydropyranyloxy-B-homo-estr-4-en-3-one, which is recrystallized from pentane.

What is claimed is:

1. A process for the preparation of a 3β-acyloxy-7-fluoro-19-nor-B-homo steroid which comprises treating the corresponding 3β-acyloxy-19-hydroxy-Δ⁵ steroid of the formula:

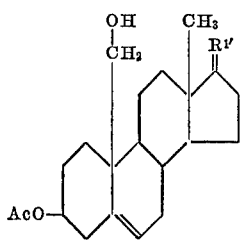

wherein Ac is a hydrocarbon carboxylic acyl group of less than 12 carbon atoms and $R^{1'}$ is an oxygen atom or the group

in which $R^{2'}$ is hydrogen or a hydrocarbon carboxylic acyloxy group of less than 12 carbon atoms, with an α-fluorinated amine of the formula:

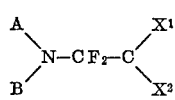

wherein $X^1$ is fluoro or chloro, $X^2$ is fluoro, chloro or trifluoromethyl, and each of A and B are lower alkyl of one to six carbon atoms or, taken together, alkylene of five to seven carbon atoms, said treatment being conducted at a temperature at or below about 0° C. in an inert, nonpolar solvent.

2. The process according to claim 1 wherein the α-fluorinated amine is 1-diethylamino-1,1,2-trifluoro-1-chloro-ethane, and said treatment is conducted at about −20° C.

3. The process of claim 2 wherein the starting material is a 3β-acyloxy-19-hydroxypregn-5-en-20-one having either hydrogen or an acyloxy group in the 17α-position.

4. The process of claim 3 wherein the starting material is 3β,17α-diacetoxy-19-hydroxypregn-5-en-20-one.

5. The process of claim 2 wherein the starting material is 3β-acetoxy-19-hydroxyandrost-5-en-17-one.

6. Compounds of the formula:

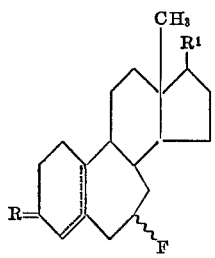

wherein R is an oxygen atom or the group

in which $R^5$ is hydrogen, tetrahydropyranyl, or a hydrocarbon carboxylic acyl group of less than 12 carbon atoms, $R^1$ is an oxygen atom or the group

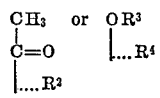

in which $R^2$ is hydrogen, hydroxy or a hydrocarbon carboxylic acyloxy group of less than 12 carbon atoms, $R^3$ is hydrogen, tetrahydropyranyl or a hydrocarbon carboxylic acyl group of less than 12 carbon atoms, and $R^4$ is hydrogen, lower alkyl, lower alkenyl, or lower alkynyl, and the dotted line between C–4, C–5 and C–10 in ring A is a double bond between C–4 and C–5 or between C–5 and C–10.

7. Compounds of the formula:

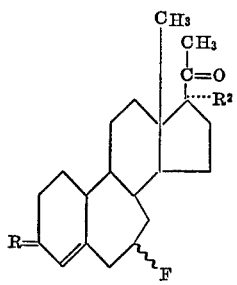

wherein R is an oxygen atom or the group

in which $R^5$ is hydrogen, tetrahydropyranyl or a hydrocarbon carboxylic acyl group of less than 12 carbon atoms and $R^2$ is hydrogen, hydroxy, or a hydrocarbon acyloxy group of less than 12 carbon atoms.

8. Compounds according to claim 7 wherein R is an oxygen atom and $R^2$ is hydrogen.

9. Compounds according to claim 7 wherein R is an oxygen atom and $R^2$ is acyloxy.

10. Compounds according to claim 7 wherein R is an oxygen atom and $R^2$ is acetoxy.

11. Compounds of the formula:

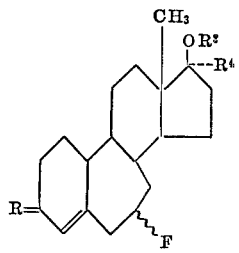

wherein R is an oxygen atom or the group

in which $R^5$ is hydrogen, tetrahydropyranyl, or a hydrocarbon carboxylic acyl group of less than 12 carbon atoms; $R^3$ is hydrogen, tetrahydropyranyl, or a hydrocarbon carboxylic acyl group of less than 12 carbon atoms, and $R^4$ is hydrogen, lower alkyl, lower alkenyl or lower alkynyl.

12. Compounds according to claim 11 wherein R is an oxygen atom, and $R^3$ and $R^4$ are each hydrogen.

13. Compounds according to claim 11 wherein R is an oxygen atom, $R^3$ is hydrogen and $R^4$ is methyl.

14. Compounds according to claim 11 wherein R is an oxygen atom, $R^3$ is hydrogen and $R^4$ is ethyl.

15. Compounds according to claim 11 wherein R is an oxygen atom, $R^3$ is hydrogen and $R^4$ is vinyl.

16. Compounds according to claim 11 wherein R is an oxygen atom, $R^3$ is hydrogen and $R^4$ is ethynyl.

References Cited
UNITED STATES PATENTS

| | | | |
|---|---|---|---|
| 3,059,019 | 10/1962 | Ringold | 260—468 |
| 3,234,269 | 2/1966 | Jeger | 260—488 |
| 3,291,836 | 12/1966 | Tadanier | 260—586 |

JAMES A. PATTEN, *Primary Examiner.*

V. GARNER, *Assistant Examiner.*

U.S. Cl. X.R.

260—476, 468, 482, 484, 471, 473, 586, 410, 345.9, 345.8, 482, 487, 999

PO-1050
(5/69)

UNITED STATES PATENT OFFICE
CERTIFICATE OF CORRECTION

Patent No. 3,444,188        Dated May 13, 1969

Inventor(s) Lawrence H. Knox

It is certified that error appears in the above-identified patent and that said Letters Patent are hereby corrected as shown below:

Column 3, lines 37 to 49, Formula V, that portion of the formula reading:

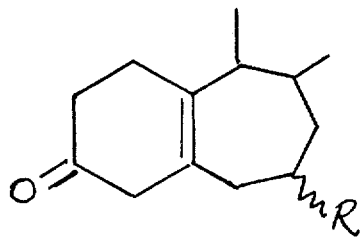  should read  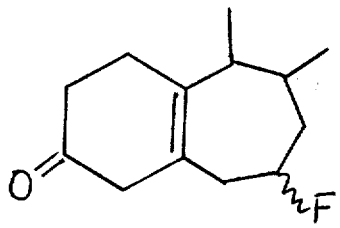

Column 5, line 4, that portion of the compound reading "-19-hor-" should be -- -19-nor- --; line 53, that portion of the compound reading "B-homo-10-norpregn-" should read -- B-homo-19-norpregn- --; line 53, "recrsytallized" should be --recrystallized--; line 69, that portion of the compound reading "17α-propionolyoxy-" should read --17α-propionoyloxy- --. Column 9, line 1, that portion of the compound reading "-ethylnyl-" should read -- -ethynyl- --; lines 54 to 59, the formula in Claim 1 reading:

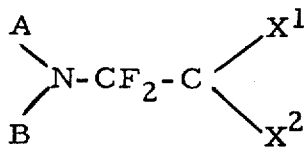  should read  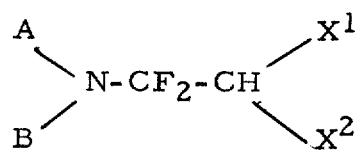

Column 10, lines 2 to 11, that portion of the formula in Claim 6 reading:

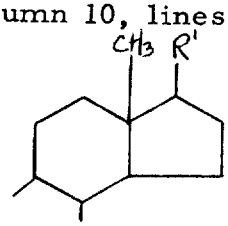  should read  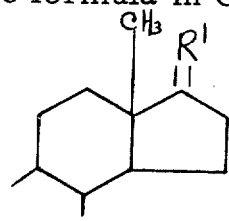

SIGNED AND
SEALED
APR 28 1970

(SEAL)
Attest:

Edward M. Fletcher, Jr.
Attesting Officer

WILLIAM E. SCHUYLER, JR.
Commissioner of Patents